UNITED STATES PATENT OFFICE.

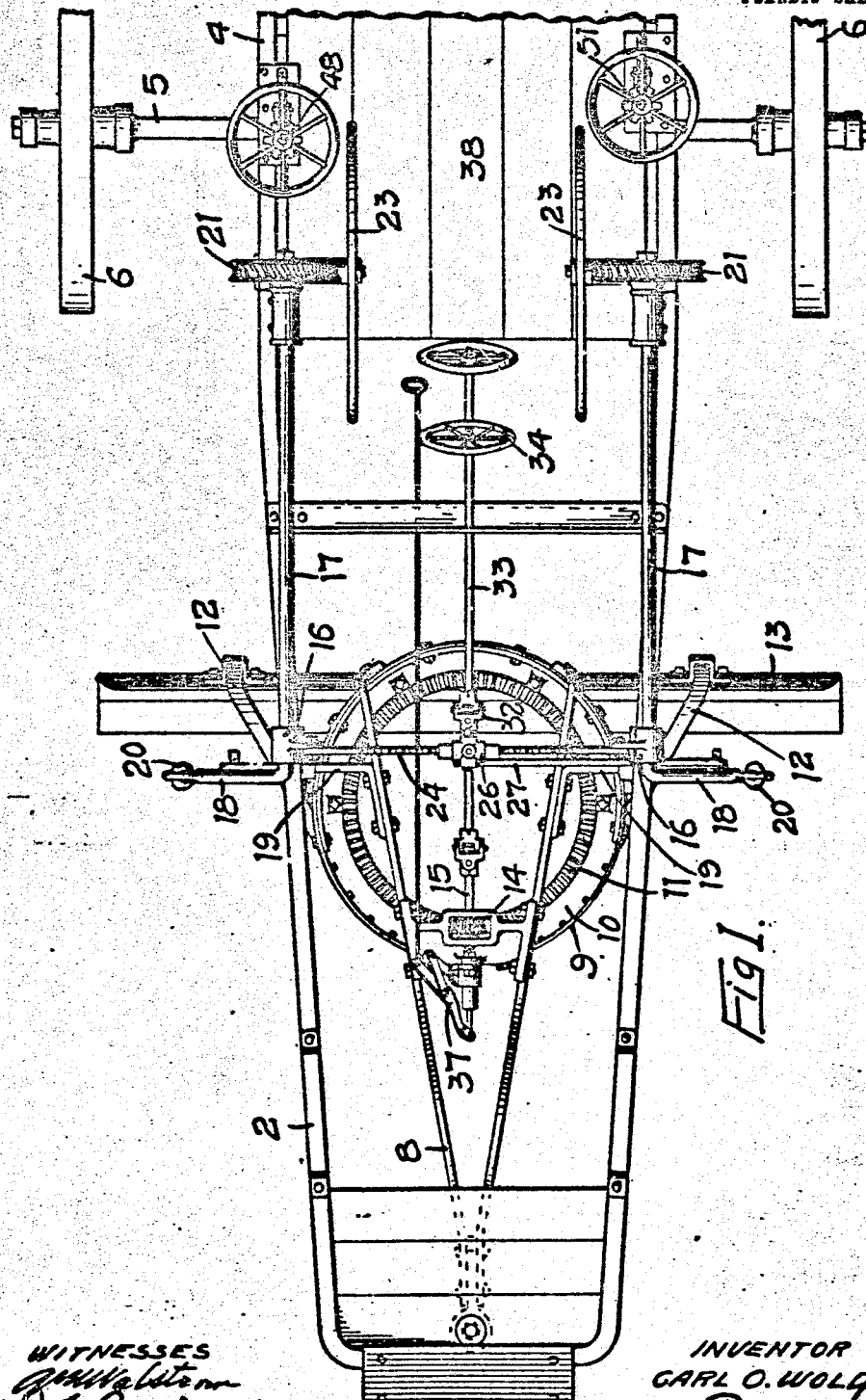

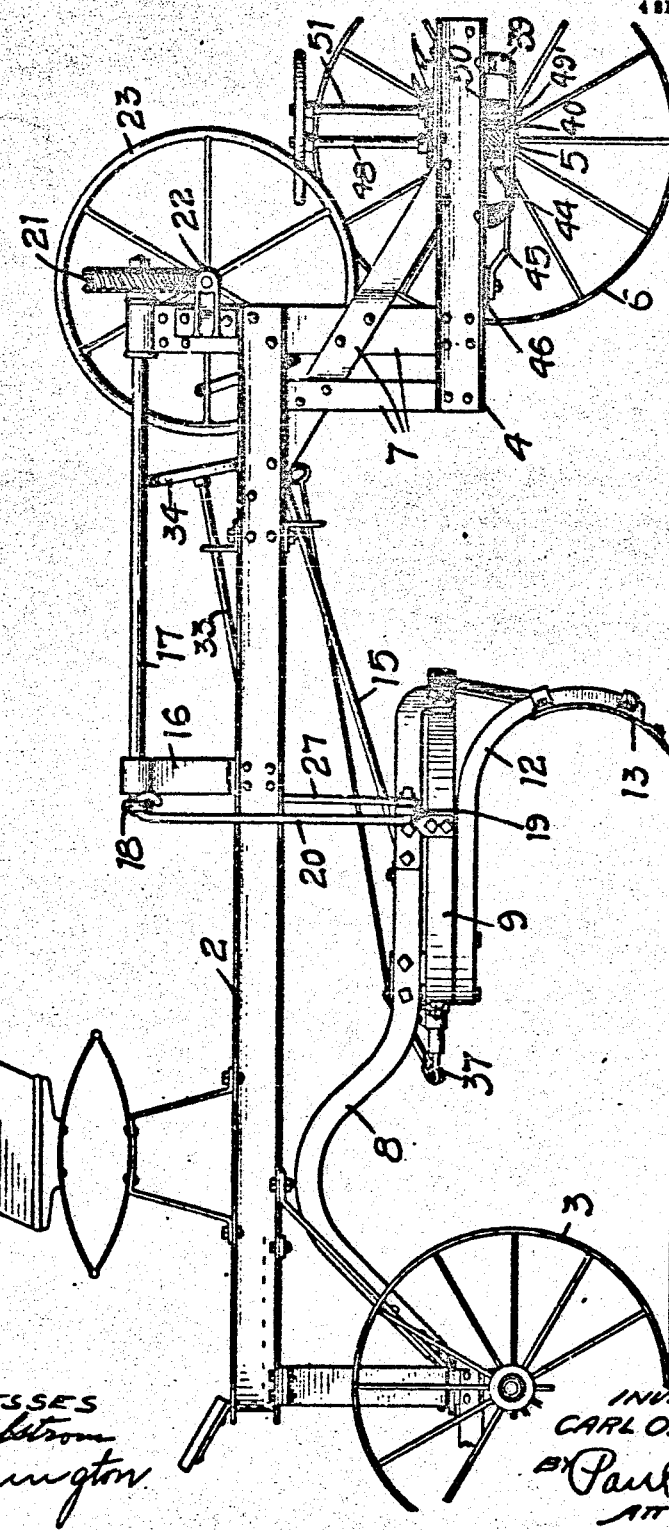

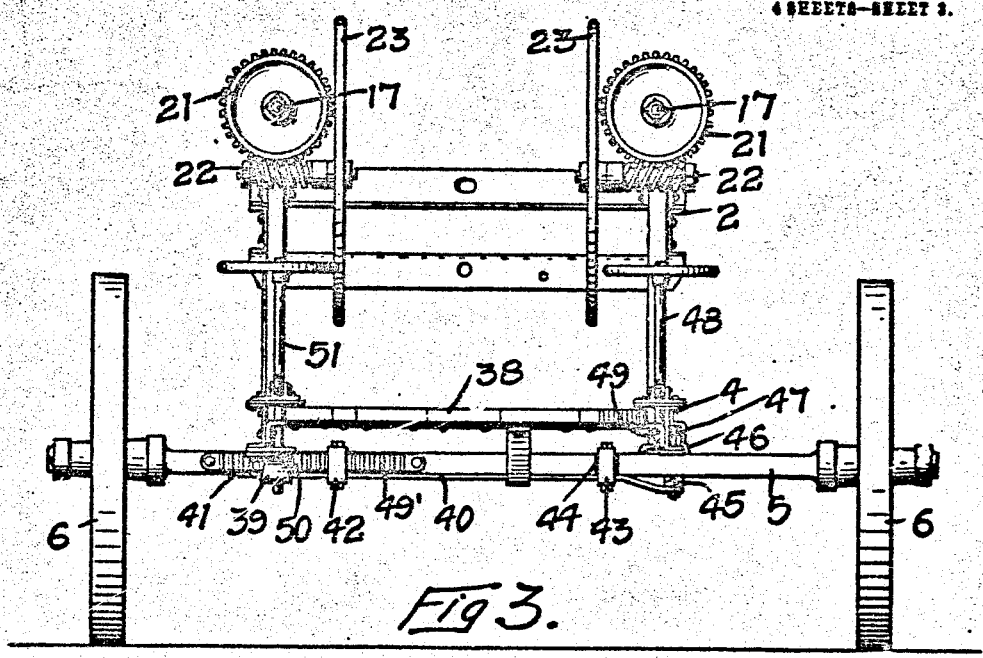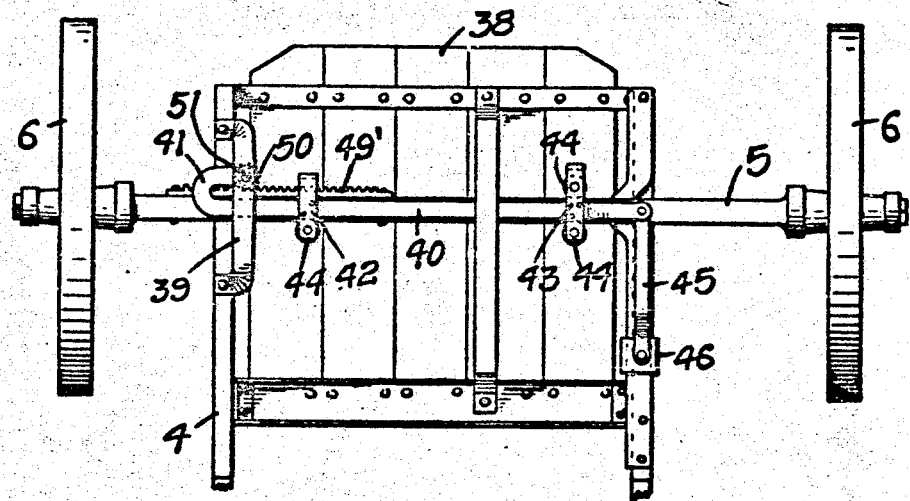

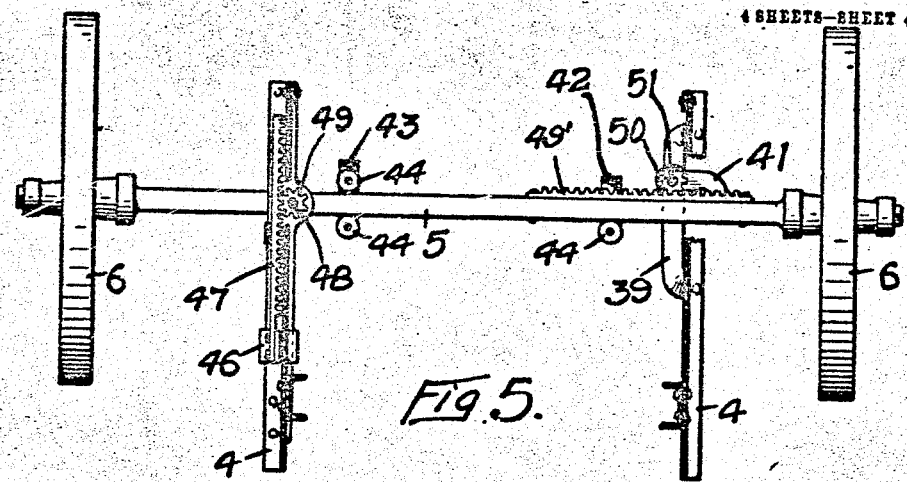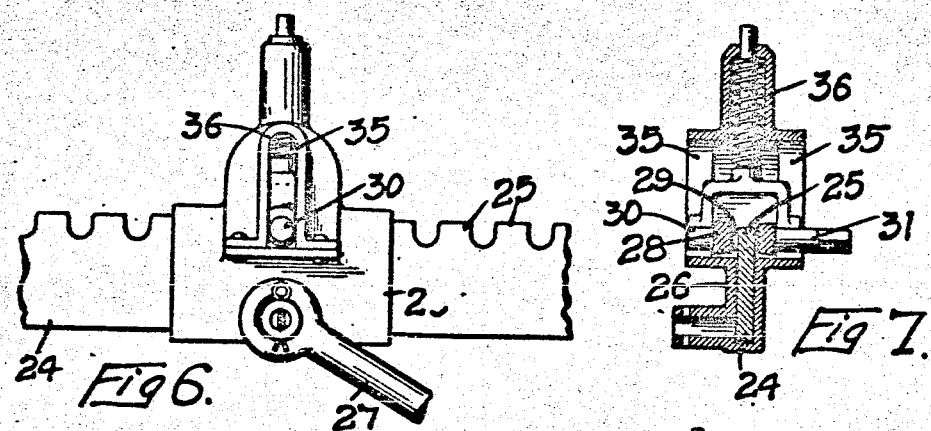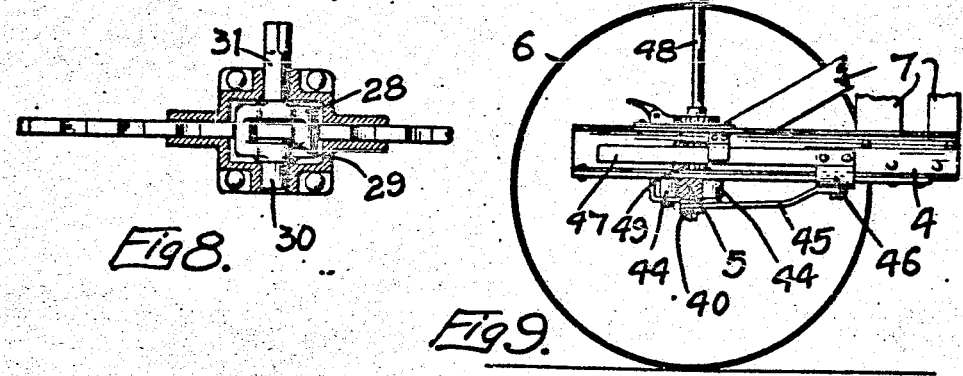

CARL O. WOLD, OF MINNEAPOLIS, MINNESOTA.

ROAD-GRADING MACHINE.

968,439. Specification of Letters Patent. Patented Aug. 23, 1910.

Application filed June 8, 1909. Serial No. 500,830.

*To all whom it may concern:*

Be it known that I, CARL O. WOLD, of Minneapolis, Hennepin county, Minnesota, have invented certain new and useful Improvements in Road-Grading Machines, of which the following is a specification.

The object of my invention is to simplify and improve the road grading machines in general use to the end that they can be more easily handled and will be more effective for the purpose designed.

The invention consists generally in an improved center shift for the scraper mechanism.

Further, the invention consists of an improved rear axle shift, by means of which the machine can be held to the work and can be readily adapted for various conditions, under which it is used.

In the accompanying drawings, forming part of this specification, Figure 1 is a plan view of a road grading machine, embodying my invention, Fig. 2 is a side elevation of the same, Fig. 3 is a rear view, illustrating the rear axle shift, Fig. 4 is a bottom view of the same, Fig. 5 is a detail plan view of the rear axle shift, Fig. 6 is a detail view of the center shift, Fig. 7 is a sectional view, illustrating the center shift mechanism taken on a section line at right angles substantially to Fig. 6, Fig. 8 is a top view, partially in section of the center shift, Fig. 9 is a detail, sectional view, showing a portion of the rear axle shift.

In the drawing, 2 represents the raised forward portion of the main frame having forward carrying wheels 3 and 4 is a rear portion of said frame below the level thereof and having a rear axle 5 and carrying wheels 6. Braces 7 connect the frames 2 and 4.

8 is a secondary frame, similar to those usually employed in mechanism of this kind, supporting a turntable frame 9 wherein a ring 10 is seated and adapted to revolve and provided with a gear ring 11. Bars 12 rigidly connect the ring 10 with a scraper 13. The ring 10 is revolved by the engagement of a pinion 14 on the shaft 15 with the teeth of the gear ring 11. Upright brackets 16 are mounted on the frame of the machine on each side of said turntable and have bearings for the shafts 17, which have outwardly turned ends 18. Brackets 19 are secured to the secondary frame and have their outer ends pivotally connected with the ends 18 by rods 20. The shafts 17 have worm wheels 21 thereon, which are engaged by screws 22 provided with operating wheels 23. The brackets 16 are connected across the machine by a bar 24 having a series of teeth 25 thereon. A sliding carriage 26 is mounted on said bar and a rod 27 pivotally connects said carriage with a bracket 19 on one side of the machine.

28 is a shifter casting having an eye 29 therein to receive the teeth 25, the ends of the casting dropping into the recesses between the teeth, as indicated in Fig. 8. This casting has studs 30 and 31 thereon, the latter of which has a squared end to fit a socket in a coupling 32 carried by a shaft 33, having an operating wheel 34. The studs 30 and 31 have bearings in the carrier 26 and are vertically movable in slots 35 therein and said casting is normally held in engagement with the teeth by a spring 36. When the casting is revolved, it will roll on the bar, the end of the casting forming a pivot, and travels from side to side of the bar when a twisting strain is applied to the studs 30 and 31. This movement of the shifter casting back and forth on the bar will transmit movement through the rod 27 to shift the scraper blade lengthwise from side to side of the machine. I have found this to be an extremely simple and effective means for obtaining the desired shift of the scraper. Rotary movement of the ring 10 is prevented by means of the locking device 37.

The rear frame 4 of the machine has a platform 38 thereon supported by the axle 5. A strap 39 is secured to the under side of the frame 4 and a bar 40 is provided with a hooked end 41, which is pivotally connected with the lower end of a post 51, hereinafter referred to. This bar has cross arms 42 and 43 thereon, carrying anti-friction rollers 44, which bear on the sides of the axle. A link 45 connects one end of the bar 40 with a slide 46 that is movable back and forth on one of the rails of the frame 4. A rack bar 47 is secured to the slide 46 and a post 48 has a pinion 49 in engagement with the teeth of said bar. When the post 48 is revolved, power will be transmitted through the pinion and rack bar through the slide 46 and from thence through the links 45 to the bar 40 to oscillate the axle and set it at an angle to the direction of movement, or obliquely with respect to the frame of the machine. On the other side of the machine, a rack bar 49' is provided, secured to the axle and meshing with the pinion 50 on a post 51, the revolution of which will shift the rear axle from side to side and permit its adjustment with respect to the work. This will be independent of the oscillating adjustment of the axle by means of the rack bar 47 and its connections. These two forms of shift are simple and inexpensive in construction and at the same time, are strong and durable and very effective for the purpose designed.

I have shown this invention in connection with a road grading machine, but do not wish to confine myself to this application, as the invention is capable of use with other types of machines intended for the same or for other purposes.

I claim as my invention:—

1. The combination, with a frame having carrying wheels, of a secondary frame pivotally connected with said first named frame, means for raising and lowering said secondary frame, a transversely arranged toothed bar, a carrier slidably mounted thereon and having slots therein forming guide ways, a shifter having studs movable within said slots toward and from said bar, said shifter being capable of a rolling movement on said bar from end to end thereof and adapted to move said carrier thereon with a step by step movement.

2. The combination, with a wheeled frame, of a secondary frame pivotally connected therewith, means for shifting said secondary frame from side to side, said shifting means including a toothed bar, a carrier slidably mounted thereon and having guide ways, a rocking shifter having studs fitting within said guide ways and movable therein toward and from said bar, means for yieldingly holding said shifter in engagement with said bar, and said shifter being capable of an end over end movement on the teeth of said bar, substantially as described.

3. The combination, with a frame having carrying wheels, of a secondary frame pivoted thereon, a transversely arranged toothed bar, a carrier slidably mounted thereon and pivotally connected with said secondary frame, a rocking shifter having studs slidably mounted in said carrier toward and from said bar, said shifter having a pin vertically slidable in said carrier, and a spring carried by said pin and yieldingly holding said shifter in engagement with the teeth of said bar.

4. In a machine of the class described, a center shifting device, comprising a toothed bar, a carrier slidable thereon and having vertical slots, a shifter having studs journaled in said slots and vertically movable therein, means for rocking said shifter to roll it on said bar from side to side.

5. The combination, with a frame, of a pivoted secondary frame, a toothed cross bar, a carrier slidable thereon and pivotally connected with said secondary frame, a rocking shifter inclosed within said carrier and having studs slidable in guide ways provided in said carrier, said shifter being substantially rectangular in form and provided with an eye to receive a tooth of said bar, and adapted to be moved end over end on said bar, said shifter rising in the guide ways in said carrier to permit such shifting movement, substantially as described.

6. The combination, with a main frame having carrying wheels, of a pivoted secondary frame, a cross bar, a carrier slidable thereon and pivotally connected with said secondary frame, said carrier having vertical guide ways therein, a shifter having studs slidable in said guide ways and adapted to engage said bar, a pin carried by said shifter and slidable in said carrier, and a spring coiled about said pin and normally holding said shifter in engagement with said bar.

7. In a grading machine, the combination, with a frame having carrying wheels, of a secondary frame pivoted thereon, a scraper carried by said secondary frame, means for shifting said secondary frame from side to side, said shifting means including a toothed bar, a carrier slidably mounted thereon and pivotally connected with said secondary frame, said carrier having guide ways, a shifter, including a rectangular part having an eye to receive a tooth of said bar, studs slidable in the guide ways of said carrier, one of said studs having an end adapted to receive an operating means, and means included within said carrier and yieldingly holding said shifter in engagement with the teeth of said bar.

8. The combination, with a toothed bar, of a carrier slidably mounted thereon having vertical guide ways therein, a shifter having studs fitting within said guide ways and vertically movable therein, means for rocking said shifter to move said carrier, and means yieldingly holding said shifter in engagement with the teeth of said bar.

9. The combination, with a frame, of an axle having carrying wheels, a strap secured to said frame transversely with respect to said axle, a bar pivotally connected at one end to said strap, arms secured transversely to said bar and having guide wheels contacting with said axle, a slide mounted on said frame and pivotally connected with said bar, said slide moving in a direction at right angles substantially to the normal position of said bar, and means for reciprocating said slide to oscillate said bar and change the angle of said axle with respect to said frame.

10. The combination, with a frame, of an axle having carrying wheels, a bar having a hooked end pivotally connected with said frame, guide wheels carried by said bar and contacting with said axle, a slide mounted on said frame and having a pivotal connection with said bar, said slide moving in a direction at right angles substantially to the normal position of said bar, and means for reciprocating said slide to oscillate said bar and change the angle of said axle.

11. The combination, with a frame, of an axle having carrying wheels, a bar having a hooked end pivotally connected with said frame, said bar extending transversely of said frame parallel with said axle, means for moving said bar and frame back and forth on said axle, a slide arranged to reciprocate at an angle to said axle and having a pivotal connection with said bar, and means for operating said slide.

12. In a road grading machine the combination, with a frame having carrying wheels, of a secondary frame, a turn table frame carried by said secondary frame, a ring seated in said turn table frame and having a gear ring, a scraper connected with said ring, means for raising and lowering said ring and secondary frame, a toothed, transversely arranged bar, a carriage slidably mounted on said bar and having slots therein, a shifter having studs journaled in said slots and movable therein, and means for rocking said shifter to roll it on said bar from side to side.

13. In a road grading machine the combination, with a frame having carrying wheels, of a secondary frame, a turn table, a ring seated in said turn table and having a gear ring, a scraper carried by said ring, means for raising and lowering said ring and secondary frame, a toothed transversely arranged bar, a carrier slidably mounted on said bar and having guide ways therein, a shifter having studs fitting within said guide ways and movable therein, means mounted in said carrier and yieldingly holding said shifter in engagement with the teeth of said bar, and means for rocking said shifter end over end on said bar, for the purpose specified.

In witness whereof, I have hereunto set my hand this 2nd day of June 1909.

CARL O. WOLD.

Witnesses:
J. M. SULLIVAN,
J. A. BYINGTON.